United States Patent [19]

Shimura

[11] Patent Number: 4,885,468

[45] Date of Patent: Dec. 5, 1989

[54] RADIATION IMAGE RECORDING APPARATUS, AND STIMULABLE PHOSPHOR SHEET FEEDING AND LOADING APPARATUS

[75] Inventor: Kazuo Shimura, Kanagawa, Japan

[73] Assignee: Fuji Photo Film Co., Ltd., Kanagawa, Japan

[21] Appl. No.: 217,209

[22] Filed: Jul. 11, 1988

[30] Foreign Application Priority Data

Jul. 13, 1987 [JP] Japan .................................. 62-174550
Jul. 13, 1987 [JP] Japan .................................. 62-174552

[51] Int. Cl.$^4$ ............................................. G01N 23/04
[52] U.S. Cl. .................................. 250/327.2; 378/198
[58] Field of Search .......................... 250/327.2, 484.1; 378/198

[56] References Cited

U.S. PATENT DOCUMENTS 4,387,468 6/1983 Fenne et al. ......................... 378/198
4,760,255 7/1988 Kimura et al. ............... 250/484.1 B
4,786,807 11/1988 Kimura .......................... 250/327.2 J Primary Examiner—Carolyn E. Fields
Attorney, Agent, or Firm—Sughrue, Mion, Zinn, Macpeak & Seas

[57] ABSTRACT

A radiation image recording apparatus comprises a mobile case, a radiation source connected with the case, and a cassette holding section provided at a part of the case for releasably holding a cassette capable of housing a stimulable phosphor sheet therein. A first magazine holding section is provided inside of the case for releasably holding a sheet housing magazine capable of housing image-recorded stimulable phosphor sheets therein, and a second magazine holding section is provided inside of the case for releasably holding a sheet feed magazine capable of housing stimulable phosphor sheets usable for image recording therein and taking the stimulable phosphor sheets one by one out of the sheet feed magazine. A sheet conveyance system is provided for conveying the stimulable phosphor sheet taken out of the cassette into the first magazine holding section, and conveying the stimulable phosphor sheet usable for image recording taken out of the second magazine holding section into the cassette.

9 Claims, 3 Drawing Sheets

RADIATION IMAGE RECORDING APPARATUS, AND STIMULABLE PHOSPHOR SHEET FEEDING AND LOADING APPARATUS

BACKGROUND OF THE INVENTION

1. Field of the Invention

This invention relates to a radiation image recording apparatus for recording a radiation image on a stimulable phosphor sheet. This invention particularly relates to a mobile radiation image recording apparatus which is capable of being moved to a desired location for carrying out the image recording. This invention also relates to a mobile feeding and loading apparatus for stimulable phosphor sheets which is capable of being moved to a desired location for use in the image recording.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned by stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into electric signals to reproduce a visible image on a recording medium or a display device.

In the aforesaid radiation image recording and reproducing system, the image recording is first carried out on the stimulable phosphor sheet by use of an image recording apparatus provided with a radiation source. In the case where a patient as the object cannot walk, it is necessary for the image recording apparatus to be conveyed to the sickroom of the patient for recording an image of the patient on the stimulable phosphor sheet. For this purpose, there has heretofore been proposed a small, mobile image recording apparatus composed of a mobile main body having rollers or the like on the bottom surface, and a radiation source mounted on the main body via a supporting arm.

However, the proposed image recording apparatus is constituted so that only the radiation source is mobile. Therefore, with the proposed image recording apparatus, in the case where the image recording is to be carried out by moving the image recording apparatus from sickroom to sickroom, many cassettes each housing a stimulable phosphor sheet capable of being used for the image recording must be carried independently of the image recording apparatus, and it is troublesome to move the image recording apparatus and many cassettes independently of each other from sickroom to sickroom.

SUMMARY OF THE INVENTION

The primary object of the present invention is to provide a mobile radiation image recording apparatus wherein many cassettes need not be carried independently of the image recording apparatus.

Another object of the present invention is to provide a mobile feeding and loading apparatus for stimulable phosphor sheets which eliminates the necessity of the carrying of many cassettes independently of a radiation source and which enables registration of discrimination information for each image recording step.

The present invention provides a radiation image recording apparatus comprising:

(i) a mobile case, (ii) a radiation source connected with said case, (iii) a cassette holding section provided at a part of said case for releasably holding a cassette capable of housing a stimulable phosphor sheet therein, (iv) a first magazine holding section provided inside of said case for releasably holding a sheet housing magazine capable of housing a plurality of image-recorded stimulable phosphor sheets therein, (v) a second magazine holding section provided inside of said case for releasably holding a sheet feed magazine capable of housing a plurality of stimulable phosphor sheets usable for image recording therein, and provided with a take-out means for taking said stimulable phosphor sheets one by one out of said sheet feed magazine, and (vi) a sheet conveyance means for conveying said stimulable phosphor sheet, which is taken out of said cassette, into said first magazine holding section, and conveying said stimulable phosphor sheet usable for image recording, which is taken out of said second magazine holding section, into said cassette.

The present invention also provides a stimulable phosphor sheet feeding and loading apparatus comprising:

(i) a mobile case, (ii) a cassette holding section provided at a part of said case for releasably holding a cassette capable of housing therein a stimulable phosphor sheet provided with discrimination information at a part, (iii) a first magazine holding section provided inside of said case for releasably holding a sheet housing magazine capable of housing a plurality of image-recorded stimulable phosphor sheets therein, (iv) a second magazine holding section provided inside of said case for releasably holding a sheet feed magazine capable of housing a plurality of stimulable phosphor sheets usable for image recording therein, and provided with a take-out means for taking said stimulable phosphor sheets one by one out of said sheet feed magazine, (v) a sheet conveyance means for conveying said stimulable phosphor sheet, which is taken out of said cassette, into said first magazine holding section, and conveying said stimulable phosphor sheet usable for image recording, which is taken out of said second magazine holding section, into said cassette, (vi) a discrimination information reading means provided inside of said case for reading said discrimination information from the stimulable phosphor sheet conveyed by said sheet conveyance means, (vii) a registration means provided integrally with said case for input of information such as object information and image recording information, and (viii) a storage means for storing said information entered to said registration means and said discrimination information read by said discrimination information reading means.

The present invention further provides a stimulable phosphor sheet feeding and loading apparatus comprising the case, the cassette holding section, the first magazine holding section, the second magazine holding section, the sheet conveyance means, the discrimination information reading means, the registration means and the storage means which are defined above for the first-mentioned stimulalle phosphor sheet feeding and loading apparatus, and a radiation source connected with the case.

The term "mobile case" as used herein means that the size, the weight and the configuration of the case are such that the case can be moved readily by ordinary force such as pushing force or pulling force of an operator.

The term "registration means provided integrally with a case" as used herein means that the registration means can be moved together with the case. The registration means need not necessarily be secured to the case, and may be detachable from the case and connected with the case by a cable or the like.

With the radiation image recording apparatus, the first-mentioned stimulable phosphor sheet feeding and loading apparatus, and the second-mentioned stimulable phosphor sheet feeding and loading apparatus in accordance with the present invention, after the cassette housing therein the stimulable phosphor sheet usable for image recording is pulled out of the cassette holding section, subjected to image recording, and then returned to the cassette holding section, the image-recorded stimulable phosphor sheet in the cassette is taken out of the cassette, and conveyed by the sheet conveyance means into the sheet housing magazine. Also, a new stimulable phosphor sheet usable for image recording which is taken out of the sheet feed magazine is conveyed into the cassette which is now empty. Therefore, the cassette loaded with the stimulable phosphor sheet usable for image recording can be taken out of the cassette holding section and subjected to the image recording. Accordingly, a plurality of image recording operations can be carried out sequentially without many cassettes being carried.

Also, with the first-mentioned stimulable phosphor sheet feeding and loading apparatus and the second-mentioned stimulable phosphor sheet feeding and loading apparatus in accordance with the present invention wherein the storage means is provided so that the registration means and the discrimination information reading means are moved integrally with the case without being on-line connected with an image read-out apparatus, the registration of the discrimination information can be carried out each time the image recording is carried out, the registering operation can be carried out quickly, and registration errors can be prevented.

DESCRIPTION OF THE PREFERRED EMBODIMENTS

The present invention will hereinbelow be described in further detail with reference to the accompanying drawings.

Figure 1:
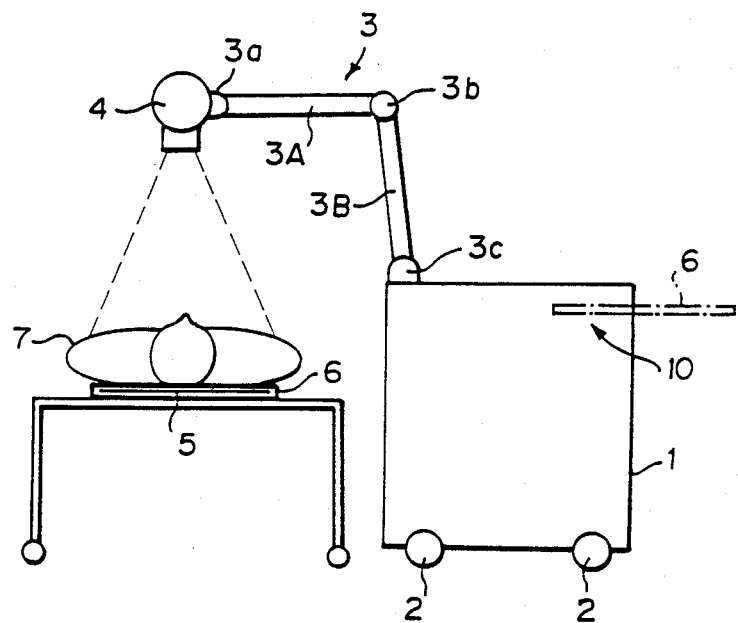
FIG. 1 is a schematic view showing an example of the use condition of an embodiment of the radiation image recording apparatus in accordance with the present invention.

With reference to FIG. 1, an embodiment of the radiation image recording apparatus in accordance with the present invention comprises a mobile case 1 provided with rollers 2, 2 on the bottom surface, and a radiation source 4 constituted by an X-ray source or the like mounted on the case 1 via a supporting arm 3. Arm segments 3A and 3B of the supporting arm 3 are rotated around rotation shafts 3a, 3b and 3c to move the radiation source 4 to a desired position. The case 1 is provided with a control means (not shown) for control of the irradiation energy, the irradiation timing, the irradiation period, or the like, of the radiation source 4. The case 1 is also provided with a cassette holding section 10 for releasably holding a radiation-permeable, lighttight cassette 6 capable of housing a stimulable phosphor sheet 5 therein. At the time image recording is to be carried out, the cassette 6 is pulled out of the position indicated by the chain line in FIG. 1, and sent to an arbitrary image recording position (at the back of an object 7 in FIG. 1). After the cassette 6 and the radiation source 4 are disposed as shown with an image recording portion of the object 7 intervening therebetween, the radiation source 4 is activated, and a radiation image of the object 7 is stored on the stimulable phosphor sheet 5. This embodiment can readily be moved by being pushed by an operator. After the image recording is finished, the operator can move the case 1 from sickroom to sickroom and can sequentially carry out the image recording of desired image recording portions of patients (objects).

Also, at the time a single image recording operation has been finished, the cassette 6 housing the image-recorded stimulable phosphor sheet 5 is fitted to the cassette holding section 10. Feed-in and feed-out of the stimulable phosphor sheet 5 in the cassette 6 will hereinbelow be described with reference to FIG. 2.

After the cassette 6 housing the image-recorded stimulable phosphor sheet 5 therein is fitted to the cassette holding section 10, a cover member 6a formed on one surface of the cassette 6 is opened, a suction cup 11 provided as a sheet take-out means at the cassette holding section 10 advances into the cassette 6, sucks up the image-recorded stimulable phosphor sheet 5, and transfers it to the sheet conveyance means 20 in the vicinity of the cassette holding section 10.

A first magazine holding section 50 for releasably holding a sheet housing magazine 8 capable of housing therein a plurality of image-recorded stimulable phosphor sheets 5, 5, . . . is provided inside of the case 1. The image-recorded stimulable phosphor sheet 5 taken by the suction cup 11 out of the cassette 6 as mentioned above is conveyed by the sheet conveyance means 20 composed of endless belts, guide plates and the like in the directions as indicated by the arrows A1 and A2 into the sheet housing magazine 8 held at the first magazine holding section 50.

On the other hand, a second magazine holding section 60 for releasably holding a sheet feed magazine 9 capable of housing therein a plurality of stimulable phosphor sheets 5, 5, . . . usable for the image recording is also provided inside of the case 1. At the time the image-recorded stimulable phosphor sheet 5 has been conveyed out of the cassette 6 at the cassette holding section 10, a suction cup 61 provided as a sheet take-out means at the second magazine holding section 60 sucks up and takes a single stimulable phosphor sheet 5 usable for the image recording out of the sheet feed magazine 9, and transfers the stimulable phosphor sheet 5 usable for the image recording to the sheet conveyance means 20 in the vicinity of the second magazine holding section 60. The sheet conveyance means 20 conveys the stimulable phosphor sheet 5 usable for the image recording in the directions as indicated by the arrows B1 and B2 into the cassette 6 which is now empty. The cassette 6 loaded with the stimulable phosphor sheet 5 usable for the image recording is taken out of the case 1 and used for the next image recording. After, for example, a predetermined number of image recording operations are finished, the sheet housing magazine 8 which houses therein the image-recorded stimulable phosphor sheets 5, 5, . . . is taken out of the case 1 and fitted to an external image read-out apparatus.

With the aforesaid embodiment, the sheet housing magazine 8 and the sheet feed magazine 9 are provided inside of the case 1, and feed-out of the image-recorded stimulable phosphor sheet 5 from the cassette 6 and feed-in of the stimulable phosphor sheet 5 usable for the image recording to the cassette 6 are carried out at the cassette holding section 10. Therefore, it is not necessary to carry cassettes in a number equal to the number of image recording operations carried out sequentially as with the conventional technique, and the image recording by moving the radiation image recording apparatus from place to place can be carried out easily.

Figure 2:
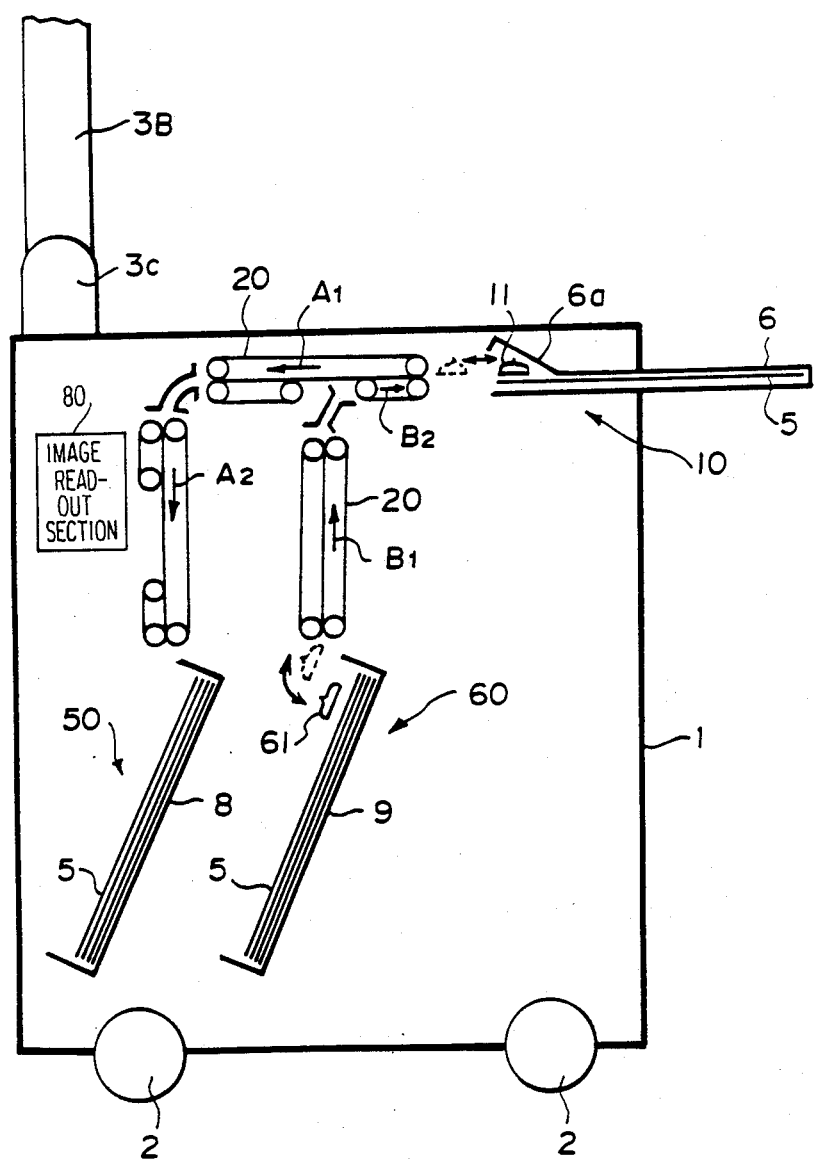
FIG. 2 is a schematic side view showing the configuration inside of the case of the embodiment shown in FIG. 1.

In the case where the stimulable phosphor sheets having different sizes are used for the image recording, the cassettes in a number equal to the number of the sheet sizes may be prepared, a plurality of the sheet housing magazines and a plurality of the sheet feed magazines may be provided in the case 1, and the stimulable phosphor sheets may be distributed among the sheet housing magazines and among the sheet feed magazines in accordance with the sheet sizes. On the other hand, in a radiation image read-out apparatus, the image read-out can be carried out only from a part of a large stimulable phosphor sheet. Therefore, only the stimulable phosphor sheets having the largest size may be used as shown in FIG. 2, and recording of radiation images of various sizes may be carried out on the stimulable phosphor sheets having the largest size. Information representing the recording of a small radiation image may be sent to an image read-out apparatus to have the image read-out apparatus carry out the image read-out only from the small image forming region on the largest stimulable phosphor sheet.

The mobile radiation image recording apparatus in accordance with the present invention may also be provided with an image read-out function for exposing the image-recorded stimulable phosphor sheet 5 taken out of the cassette 6 to stimulating rays, and photoelectrically detecting light emitted by the image-recorded stimulable phosphor sheet 5 in proportion to the stored radiation energy. In this case, the image read-out means may be provided between the cassette holding section 10 and the first magazine holding section 50, and image signals detected by the image read-out means may be stored on a magnetic disk, an optical disk or the like in the mobile radiation image recording apparatus.

Figure 3:
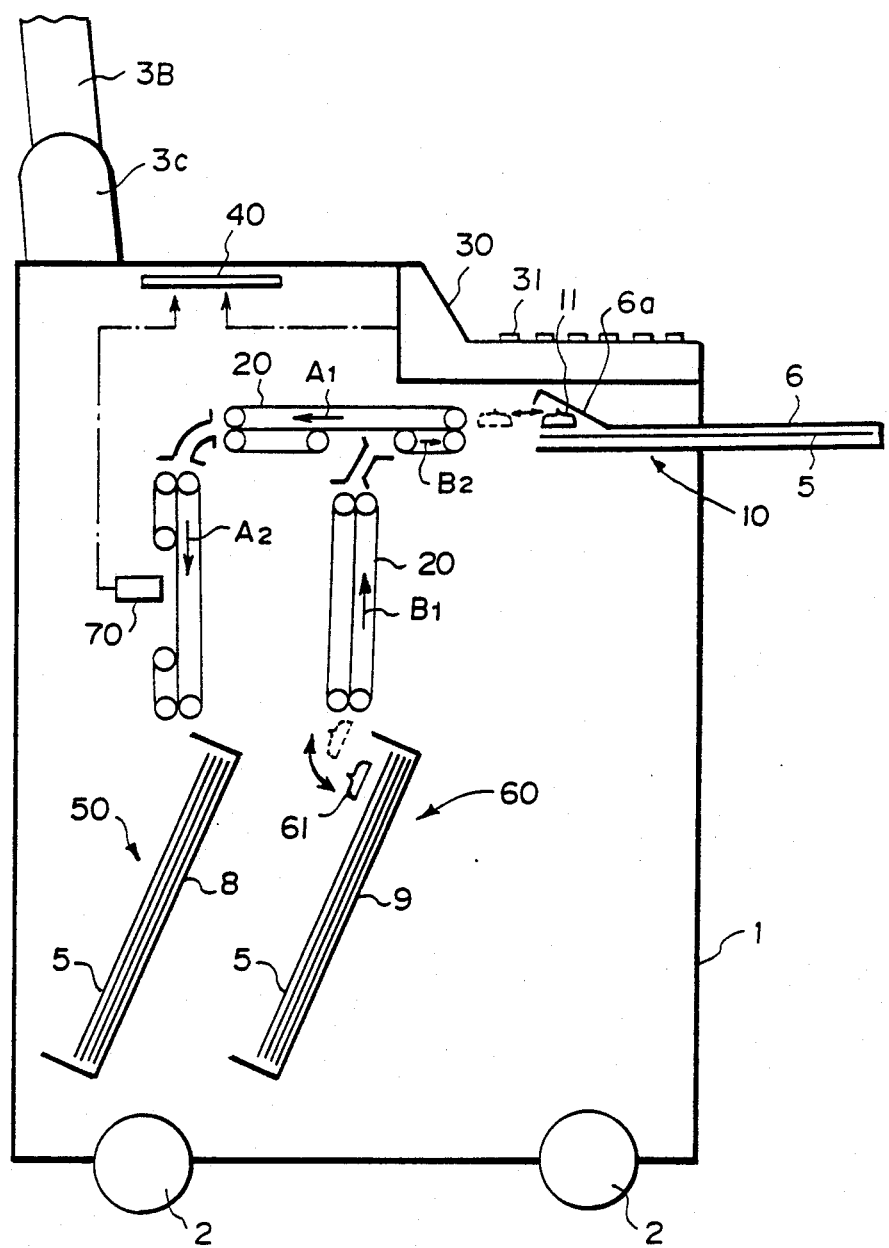
FIG. 3 is a schematic side view showing an embodiment of the stimulable phosphor sheet feeding and loading apparatus in accordance with the present invention.

An embodiment of the stimulable phosphor sheet feeding and loading apparatus in accordance with the present invention will be described hereinbelow with reference to FIG. 3. In FIG. 3, similar elements are numbered with the same reference numerals with respect to FIG. 2.

In the embodiment shown in FIG. 3, ID information is registered before or after the image recording. For this purpose, this embodiment is provided with a registration means 30 for the registration of the ID information at the upper part of the case 1. Each time the image recording is carried out, the ID information, for example, the object information such as the name and sex of the object, and the image recording information such as the date of image recording, image recording method and image recording portion, is entered from a keyboard 31. The entered ID information is stored on a storage means 40 constituted by an optical card, an IC card or the like which is releasably fitted in the apparatus.

Figure 4:
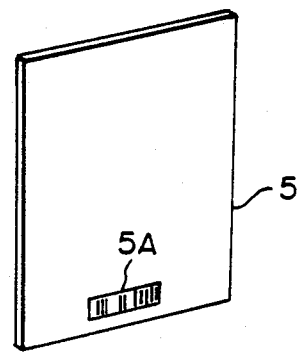
FIG. 4 is a perspective view showing a stimulable phosphor sheet.

Also, as shown in FIG. 4, the back surface of the stimulable phosphor sheet 5 is provided with a bar code 5A representing the discrimination information for discriminating the stimulable phosphor sheet 5 from other stimulable phosphor sheets. A bar code reader 70 for reading the bar code 5A is provided in the conveyance path for the stimulable phosphor sheets. The bar code 5A read by the bar code reader 70 is sent to the storage means 40. The storage means 40 stores the bar code 5A and the aforesaid ID information of the same stimulable phosphor sheet 5 to correspond to each other.

In this embodiment, after, for example, a predetermined number of image recording operations are finished, the sheet housing magazine 8 which houses therein the image-recorded stimulable phosphor sheets 5, 5, . . . is taken out of the case 1 and fitted to an external image read-out apparatus. At this time, the storage means 40 is also taken out of the case 1, and sent to the image read-out apparatus together with the sheet housing magazine 8.

With this embodiment provided with the registration means 30 and the bar code reader 70, the registration of the ID information can be carried out for each image recording operation, and registration errors can be prevented.

In the embodiment shown in FIG. 3, as in the embodiment shown in FIG. 1, the radiation source 4 is connected with the case 1 via the supporting arm 3 (only the arm segment 3B and the rotation shaft 3c of the supporting arm 3 are shown in FIG. 3). However, the radiation source 4 need not necessarily be connected to the case 1. The radiation source 4 may be provided independently of the case 1, and the stimulable phosphor sheet feeding and loading apparatus may be constituted only by the case 1 having the aforesaid configuration.

In this embodiment, as in the embodiment shown in FIG. 1, only the stimulable phosphor sheets having the largest size may be used as shown in FIG. 3, and recording of radiation images of various sizes may be carried out on the stimulable phosphor sheets having the largest size. Information representing the recording of a small radiation image may be entered from the registration means 30 to have the image read-out apparatus carry out the image read-out only from the small image forming region on the largest stimulable phosphor sheet. Also, in order to enter the ID information or the like to the image read-out apparatus, instead of using the IC card or the like taken out of the stimulable phosphor sheet feeding and loading apparatus, the registration means 30 and the image read-out apparatus may be connected with each other by a connector after a series of image recording operations are finished.

The bar code reader 70 may be provided in the conveyance path for the stimulable phosphor sheets between the sheet feed magazine 9 and the cassette 6 for reading the bar code of the stimulable phosphor sheet 5 which is to be sent to the image recording step. The discrimination information provided on the stimulable phosphor sheet 5 need not necessarily be expressed by the bar code, and any means such as a magnetic card piece may be employed for this purpose. Also, the discrimination information reading means may be selected in accordance with the kind of the discrimination information. Instead of providing the discrimination information on the back surface of the stimulable phosphor sheet 5, the discrimination information may be provided on the front surface of the stimulable phosphor sheet 5 in the case where the front surface has a margin.

I claim:

1. A radiation image recording apparatus comprising:
   (i) a mobile case,
   (ii) a radiation source connected with said case,
   (iii) a cassette holding section provided at a part of said case for releasably holding a cassette capable of housing a stimulable phosphor sheet therein,
   (iv) a first magazine holding section provided inside of said case for releasably holding a sheet housing magazine capable of housing a plurality of image-recorded stimulable phosphor sheets therein,
   (v) a second magazine holding section provided inside of said case for releasably holding a sheet feed magazine capable of housing a plurality of stimulable phosphor sheets usable for image recording therein, and provided with a take-out means for taking said stimulable phosphor sheets one by one out of said sheet feed magazine, and
   (vi) a sheet conveyance means for conveying said stimulable phosphor sheet, which is taken out of said cassette, into said first magazine holding section, and conveying a stimulable phosphor sheet usable for image recording, which is taken out of said second magazine holding section, into said cassette.

2. A radiation image recording apparatus as defined in claim 1 further provided with an image read-out means for exposing the image-recorded stimulable phosphor sheet taken out of said cassette to stimulating rays, and photoelectrically detecting light emitted by said image-recoded stimulable phosphor sheet in proportion to the stored radiation energy.

3. A radiation image recording apparatus as defined in claim 2 wherein said image read-out means is provided between said cassette holding section and said first magazine holding section.

4. A stimulable phosphor sheet feeding and loading apparatus comprising:
   (i) a mobile case,
   (ii) a cassette holding section provided at a part of said case for releasably holding a cassette capable of housing therein a stimulable phosphor sheet provided with discrimination information at a part,
   (iii) a first magazine holding section provided inside of said case for releasably holding a sheet housing magazine capable of housing a plurality of image-recorded stimulable phosphor sheets therein,
   (iv) a second magazine holding section provided inside of said case for releasably holding a sheet feed magazine capable of housing a plurality of stimulable phosphor sheets usable for image recording therein, and provided with a take-out means for taking said stimulable phosphor sheets one by one out of said sheet feed magazine,
   (v) a sheet conveyance means for conveying said stimulable phosphor sheet, which is taken out of said cassette, into said first magazine holding section, and conveying a stimulable phosphor sheet usable for image recording, which is taken out of said second magazine holding section, into said cassette,
   (vi) a discrimination information reading means provided inside of said case for reading said discrimination information from the stimulable phosphor sheet conveyed by said sheet conveyance means,
   (vii) a registration means provided integrally with said case for input of information, and
   (viii) a storage means for storing said information entered to said registration means and said discrimination information read by said discrimination information reading means.

5. A stimulable phosphor sheet feeding and loading apparatus as defined in claim 4 wherein said discrimination information is represented by a bar code, and said discrimination information reading means is a bar code reader.

6. A stimulable phosphor sheet feeding and loading apparatus as defined in claim 4, wherein said information entered to said registration means is object and image recording information.

7. A stimulable phosphor sheet feeding and loading apparatus comprising:
   (i) a mobile case,
   (ii) a radiation source connected with said case,
   (iii) a cassette holding section provided at a part of said case for releasably holding a cassette capable of housing therein a stimulable phosphor sheet provided with discrimination information at a part,
   (iv) a first magazine holding section provided inside of said case for releasably holding a sheet housing magazine capable of housing a plurality of image-recorded stimulable phosphor sheets therein, (v) a second magazine holding section provided inside of said case for releasably holding a sheet feed magazine capable of housing a plurality of stimulable phosphor sheets usable for image recording there in, and provided with a take-out means for taking said stimulable phosphor sheets one by one out of said sheet feed magazine, (vi) a sheet conveyance means for conveying said stimulable phosphor sheet, which is taken out of said cassette, into said first magazine holding section, and conveying a stimulable phosphor sheet usable for image recording, which is taken out of said second magazine holding section, into said cassette, (vii) a discrimination information reading means provided inside of said case for reading said discrimination information from the stimulable phosphor sheet conveyed by said sheet conveyance means, (viii) a registration means provided integrally with said case for input of information, and (ix) a storage means for storing said information entered to said registration means and said discrimination information read by said discrimination information reading means.

8. A stimulable phosphor sheet feeding and loading apparatus as defined in claim 7 wherein said discrimination information is represented by a bar code, and said discrimination information reading means is a bar code reader.

9. A stimulable phosphor sheet feeding and loading apparatus as defined in claim 7, wherein said information entered to said registration means is object and image recording information.

* * * * *